US008279463B2

(12) United States Patent
Jager et al.

(10) Patent No.: US 8,279,463 B2
(45) Date of Patent: Oct. 2, 2012

(54) PRINTING VIA KICKSTART FUNCTION

(75) Inventors: Jodocus F. Jager, Nijmegen (NL);
Robertus C.W.T.M. Van Den Tillaart, Gemert (NL)

(73) Assignee: Oce-Technologies B.V., Venlo (NL)

( * ) Notice: Subject to any disclaimer, the term of this patent is extended or adjusted under 35 U.S.C. 154(b) by 1320 days.

(21) Appl. No.: 11/724,257

(22) Filed: Mar. 15, 2007

(65) Prior Publication Data

US 2007/0216947 A1    Sep. 20, 2007

(30) Foreign Application Priority Data

Mar. 16, 2006  (EP) ..................................... 06111243

(51) Int. Cl.
G06F 3/12    (2006.01)
(52) U.S. Cl. ......................... 358/1.15; 358/1.9; 358/1.13
(58) Field of Classification Search .......................... None
See application file for complete search history.

(56) References Cited

U.S. PATENT DOCUMENTS

| | | | |
|---|---|---|---|
| 5,299,296 A | 3/1994 | Padalino et al. | |
| 5,760,774 A | 6/1998 | Grossman et al. | |
| 5,825,988 A * | 10/1998 | Collard et al. | 358/1.13 |
| 5,873,659 A * | 2/1999 | Edwards et al. | 400/61 |
| 5,918,988 A * | 7/1999 | Van Oijen | 400/76 |
| 6,151,464 A * | 11/2000 | Nakamura et al. | 399/79 |
| 6,545,769 B2 * | 4/2003 | Collard et al. | 358/1.16 |
| 6,621,592 B1 | 9/2003 | Takayama et al. | |
| 6,684,368 B1 | 1/2004 | Hull et al. | |
| 6,872,015 B2 * | 3/2005 | Roosen et al. | 400/61 |
| 6,894,802 B1 * | 5/2005 | Biondi et al. | 358/1.16 |
| 7,054,021 B2 * | 5/2006 | Sesek et al. | 358/1.15 |
| 7,177,040 B2 * | 2/2007 | Roosen et al. | 358/1.15 |
| 7,180,615 B2 * | 2/2007 | Price et al. | 358/1.15 |
| 7,180,637 B2 * | 2/2007 | Tanimoto | 358/402 |
| 7,304,757 B2 * | 12/2007 | Parry et al. | 358/1.15 |
| 7,426,046 B2 * | 9/2008 | Shirai et al. | 358/1.13 |

(Continued)

FOREIGN PATENT DOCUMENTS

EP    0 962 854 A2    12/1999

(Continued)

OTHER PUBLICATIONS

Anonymous: "Delaying window position placement algorithm", Research Disclosure, Mason Publications, Hampshire, GB, vol. 347, No. 58, Mar. 1993, XP00711883, ISSN: 0374-4353.

*Primary Examiner* — Dung Tran
(74) *Attorney, Agent, or Firm* — Birch, Stewart, Kolasch & Birch, LLP

(57) ABSTRACT

A method of controlling document processing in a networked system and a digital image reproduction device for document processing are described. The system has workstations for submitting processing jobs of a user, and a memory unit that manages the jobs that are waiting to be executed. The method includes providing, at a user interface of the digital image reproduction device, control elements for a user to select a processing job from the processing jobs in a logical storage space; and executing the selected processing job. Kickstart processing jobs are selected, based on predetermined kickstart criteria, from the processing jobs in the memory unit, and a corresponding set of kickstart control elements is provided at the user interface, each coupled to a respective one of the selected kickstart processing jobs. When a kickstart control element is activated by a user, the associated kickstart processing job is directly initiated.

21 Claims, 5 Drawing Sheets

U.S. PATENT DOCUMENTS

| | | | |
|---|---|---|---|
| 7,545,522 B1 * | 6/2009 | Lou ............................... | 358/1.14 |
| 7,565,608 B2 * | 7/2009 | Faraday et al. ............... | 715/723 |
| 2001/0000027 A1 * | 3/2001 | Collard et al. ................ | 399/398 |
| 2002/0057455 A1 * | 5/2002 | Gotoh et al. .................. | 358/1.15 |
| 2002/0085224 A1 * | 7/2002 | Price et al. ................... | 358/1.13 |
| 2002/0105666 A1 * | 8/2002 | Sesek .......................... | 358/1.14 |
| 2002/0184630 A1 | 12/2002 | Nishizawa et al. | |
| 2004/0004735 A1 | 1/2004 | Oakeson et al. | |
| 2004/0008227 A1 * | 1/2004 | Kulas ............................ | 345/772 |
| 2005/0091575 A1 * | 4/2005 | Relyea et al. ................. | 715/502 |
| 2006/0028674 A1 | 2/2006 | Lapstun et al. | |
| 2006/0206717 A1 | 9/2006 | Holt et al. | |

FOREIGN PATENT DOCUMENTS

| | | |
|---|---|---|
| EP | 1 231 765 A2 | 8/2002 |

\* cited by examiner

PRINTING VIA KICKSTART FUNCTION

CROSS-REFERENCE TO RELATED APPLICATIONS

This nonprovisional application claims priority under 35 U.S.C. §119(a) on Patent Application No. 06111243.9, filed in the European Patent Office on Mar. 16, 2007, the entirety of which is incorporated herein by reference.

BACKGROUND OF THE INVENTION

1. Field of the Invention

The present invention relates to a method of controlling document processing in a networked system, the system comprising at least one user workstation for submitting processing jobs of a user, a memory unit that stores the processing jobs, the memory unit being arranged to manage the processing jobs in at least one logical storage space, and a digital image reproduction device for document processing. The digital image reproduction device has a user interface unit that controls the processing jobs that are stored in the logical storage space and waiting to be executed. The method comprises providing, at the user interface unit, control elements for a user to select a processing job from the processing jobs in the logical storage space, and executing the selected processing job by processing documents in the digital image reproduction device.

The present invention further relates to a digital image reproduction device for document processing for use in the networked system, the digital image reproduction device having a user interface unit that controls the processing jobs that are stored in the logical storage space and waiting to be executed; and a management unit arranged for providing, at the user interface unit, control elements for a user to select a processing job from the processing jobs in the logical storage space, and executing the selected processing job by processing documents in the digital image reproduction device.

The present invention further relates to a computer program product that implements the present invention.

2. Description of Background Art

A method of controlling document processing in a networked system is known from U.S. Pat. No. 6,545,769. The system includes a digital image reproduction apparatus (e.g. a printer), at least one workstation for a user for processing digital documents, and a network for connecting the digital image reproduction apparatus and the workstation. The digital image reproduction apparatus includes a scanner unit, a printer unit, and a user interface integrated in the apparatus, a network connection unit for coupling to the network for the purpose of communication with a digital environment including at least a number of the workstations of users and a memory unit. The user interface is provided with an input device and a display for the user to give operator control commands to the apparatus. On the user workstation, a user may generate a processing job, e.g. a print job, which is submitted via the network to the digital image reproduction device. The job is waiting for execution and must be activated at the digital image reproduction device via its user interface. The memory unit maintains a dynamic set of logical storage spaces in a memory, each logical storage space allocated to a specific user. The logical storage space of a user stores the processing print jobs waiting to be executed. The management unit, when receiving from a user's workstation a digital data file for printing, stores the job in the logic storage space of the relevant user (or dynamically allocates a logical storage space to the user), and passes the file for printing to the printer unit only on a command from the user interface, which command identifies the relevant job. Also, on receipt of a scanning job and subsequently activating the job on the user interface, the apparatus stores the data generated by the scanner unit in the existing or dynamically allocated logical storage space of the relevant user, to be accessed via the workstation of the relevant user on a command from the latter workstation. Other files, such as sets of adjustment parameters for printing or scanning processes, can also be stored in the logical storage spaces and may be manipulated via the user interface.

In the known system, when a user arrives at the operator control unit, he has to identify the relevant printing or scanning job by selecting the respective logical storage space and accessing it, select the relevant print job, and operate the print key. Printing jobs thus require several actions, which, moreover, must be done accurately.

SUMMARY OF THE INVENTION

It is an object of the present invention to provide a method and apparatus for rapidly and conveniently activating processing jobs, so that a user is kept at the apparatus for as short a time as possible.

According to a first aspect of the present invention, the object is achieved by a method of controlling document processing that comprises the steps of identifying at least one kickstart processing job from the processing jobs in the memory unit based on kickstart criteria; providing, at the user interface unit, at least one kickstart control element; indicating, at the user interface unit for each kickstart control element, a kickstart processing job coupled to the respective kickstart control element; and initiating a kickstart processing job in the digital image reproduction device, when the respective kickstart control element has been activated by a user.

According to a second aspect of the invention the object is achieved with a digital image reproduction device, wherein the management unit is arranged for identifying at least one kickstart processing job from the processing jobs in the memory unit based on kickstart criteria; providing, at the user interface unit, at least one kickstart control element; indicating, at the user interface unit for each kickstart control element, a kickstart processing job coupled to the respective kickstart control element; and initiating a kickstart processing job in the digital image reproduction device, when the respective kickstart control element has been activated by a user.

According to a third aspect of the invention the object is achieved with a computer program product for performing the method.

The word kickstart indicates a way of immediately activating at least one job by a simple and direct user action. Hence the kickstart control element is a control element, e.g. a soft button on the user interface, which is provided on the digital image reproduction device for the user to immediately activate a processing job the user most likely wishes to start first according to the kickstart criteria, which criteria are indicative of the likelihood, e.g. the importance, urgency or age of respective processing jobs. The measures have the following effect. Several users may submit processing jobs to the digital image reproduction device via the memory unit, and one may subsequently walk to the digital image reproduction device. The management unit selects processing jobs based on the kickstart criteria, e.g. recent jobs or jobs of important users, and generates the kickstart control elements coupled to respective selected processing jobs. When the user arrives at the digital document processing apparatus, the user can immediately detect the kickstart control element having his/her processing job assigned. Advantageously, the job can be started immediately by the user by simply activating the kickstart control element. The advantage of the measures is that the amount of user input for operating the digital image reproduction device is significantly reduced.

The kickstart jobs according to the inventive concept may include any of a plurality of job types that have in common that they are defined at a remote place and transmitted to the device. Examples are printing a print file that has been sent from a user workstation, scanning in accordance with a set of device settings that has been defined at a user workstation and sent to the device, etc.

The invention is also based on the following recognition. When designing printing or scanning devices for business purposes it is important that functions of such devices are quickly and easily accessible. Therefore, the above-described background art system was designed, wherein processing jobs are activated by the user (owner) arriving at the digital image reproduction device. However, the activation procedure at the device console for activating a specific job still has several steps, that take more time when a relatively large number of users are sharing the same digital image reproduction device. The inventors of the present invention have seen that a user usually decides to walk to the digital image reproduction device shortly after submitting a job. The user may accumulate a few jobs first, but usually still decides to walk shortly after submitting the last one. Hence, the users arriving at the digital image reproduction device usually have recently submitted a job. According to the present invention, recently submitted jobs (from all pending jobs) are selected according to kickstart criteria such as time since submission of the job, and are assigned kickstart control elements. In this situation there is a high probability that the user arriving at the digital image reproduction device will find his/her personal kickstart control element on the user interface, e.g. a soft button carrying the persons name or job name. This has the advantage that a user's print job created at a workstation can be quickly and easily executed, when the user activates the kickstart element at the digital document processing apparatus.

In an embodiment of the method of the present invention, the step of initiating the kickstart processing job comprises at least one of: accessing the logical storage space containing the initiated kickstart processing job; executing the initiated kickstart processing job; and deleting the initiated kickstart processing job from the respective logical storage space. In a further embodiment, wherein the kickstart job is a scan job, the method includes executing the initiated kickstart processing job; and storing a digital document in a respective one of the logical storage spaces according to the initiated kickstart processing job. The initiated processing job, for example a printing or scanning job, has to be executed, which usually requires access to the respective logical storage space. Deleting the job after executing the job has the advantage that the logical storage space does not contain old, already executed jobs.

Also, the user may be identified before executing commands or jobs, e.g. by requesting a user identification code or tag, and an optional authentication. This has the advantage that security or privacy of users or jobs may be enhanced, or specific rights of the user may be verified or adhered to.

In an embodiment of the method of the present invention, wherein the memory unit is arranged for managing a dynamic set of logical storage spaces for the processing jobs, each storage space dedicated to a respective user of the system, the step of initiating the kickstart processing job comprises providing, at the user interface, a mailbox interface for manipulating the respective logical storage space containing the initiated kickstart processing job. The mailbox interface is a graphical user interface for accessing and controlling data in the logical storage space assigned to the owner of the mailbox, e.g. like a familiar mailbox type interface having a number of items waiting to be retrieved or executed and corresponding control functions. Advantageously the user gets access to his mailbox by activating a single kickstart control element.

In an embodiment of the method of the present invention, the step of initiating the kickstart processing job comprises, when a further processing job is being executed and in dependence of interrupt criteria, any one of the steps of: interrupting the further processing job that is being executed, executing the initiated kickstart processing job, and continuing the further processing job; executing the initiated kickstart processing job in an interleaved mode with the further processing job that is being executed; inserting the initiated kickstart processing job in a queue of processing jobs waiting for execution, in a particular case immediately after the further processing job that is being executed.

When an already running job is interrupted by a new job started by activating the kickstart control element, the total waiting time may be improved, e.g. when the running job is a background job or a very long job. Applying an interleave mode processes multiple jobs at the same time, although at reduced individual printing speed. Alternatively, the kickstart job may be inserted in a queue of jobs waiting for execution, for example when the interrupt criteria indicate that the current job may not be slowed down. Furthermore, the location of the new job in the queue may be affected. Changing the processing order in queues has the advantage that the user may selectively use privileges or get priority.

In an embodiment of the method of the present invention, the step of initiating the kickstart processing job comprises detecting a specific activation of the kickstart control element by the user like double activation or continuous activation in a predefined time period. This has the advantage that the user may affect the operation of the kickstart control element, e.g. for getting priority or selecting multiple jobs.

In an embodiment of the method of the present invention, the step of identifying at least one kickstart processing job comprises detecting the age of the processing jobs in the memory unit as kickstart criteria, in a particular case the at least one kickstart processing job including the processing job having the lowest age. Furthermore, by providing a plurality of kickstart control elements arranged in dependence of said detected age of the kickstart processing jobs coupled to the respective kickstart control elements, the most recent jobs will be on top of the arrangement.

This has the advantage that, while using a limited number of kickstart control elements, the chance of availability of a kickstart control element for a user arriving at the digital image reproduction device is increased. Additionally, a time interval after the processing job has been submitted may be detected as a kickstart criteria, e.g. a time interval equal to the minimum time the respective user needs to move from the workstation to the digital image reproduction device. This has the effect that, especially in busy times, a kickstart control element will not be claimed as long as the owner of a job is not able to start it.

In an embodiment of the method of the present invention, the step of providing at least one kickstart control element comprises removing a kickstart control element coupled to a kickstart processing job that is to be replaced by a different kickstart processing job according to the kickstart criteria by indicating that replacement of the kickstart processing job is imminent, in a particular case by at least one of: gradually fading away the kickstart control element; gradually moving the kickstart control element across a border of a display area; gradually changing a color of the kickstart control element. This has the advantage that the user is made aware that a kickstart control element is being removed, which prevents accidentally activating an unintended kickstart control element.

In yet another embodiment, a user may himself configure the effect of activating a kickstart control element for his own jobs. Also, the user may be enabled to configure the appearance of his kickstart control elements, e.g. by uploading a personal image of the user to be displayed on it, for easy recognition. Preferably, configuration should be possible from the user's workstation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
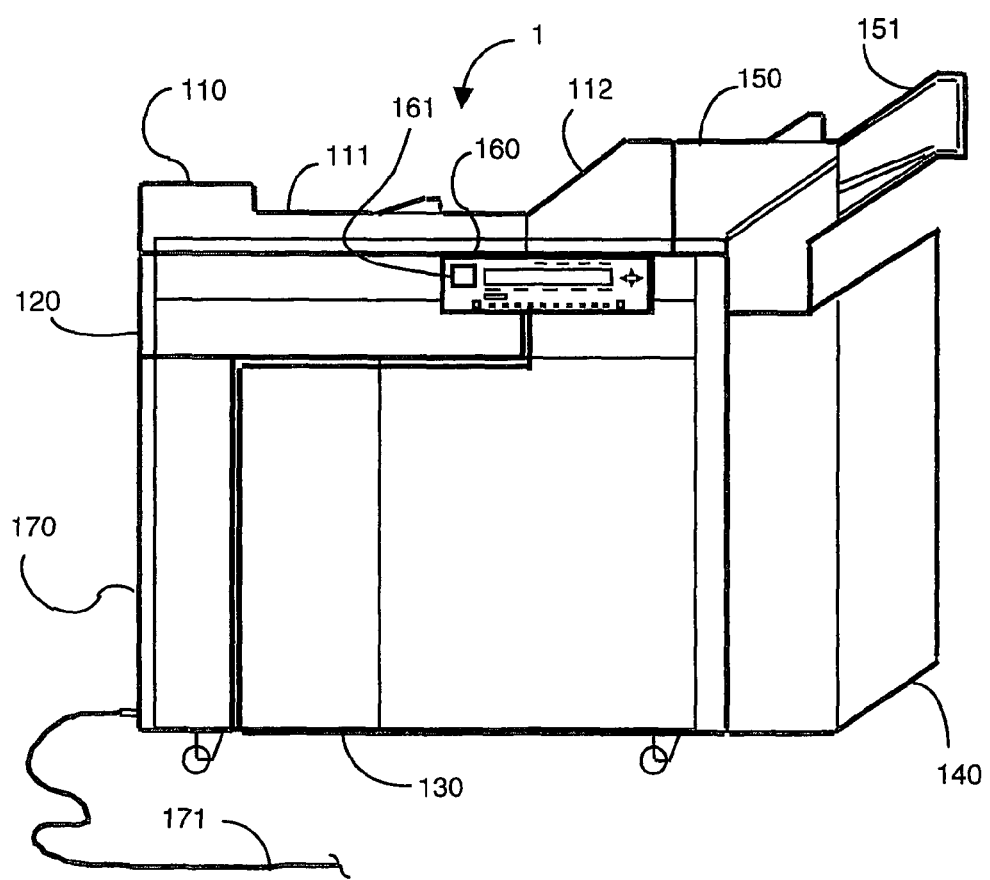
FIG. 1 illustrates a digital image reproduction device.

The Figures are diagrammatic and not drawn to scale. In the Figures, elements which correspond to elements already described have the same reference numerals.

FIG. 1 shows a digital image reproduction device 1 for processing jobs, on which the different parts are separately shown in diagram form. The documents are usually paper documents, but may include any type of sheets for carrying information, e.g. overhead sheets, books, drawings, etc.

The apparatus has a printer unit 130 which includes an electro-photographic processing section known per se, in which a photoconductive medium is charged, exposed via an LED array in accordance with digital image data, and is developed with toner powder. The toner image is then transferred and fixed on an image support, usually a sheet of paper. A stock of image supports in different formats and orientations is available in a supply section 140. The image supports with the toner image are transported to the finishing and delivery section 150, which if necessary collects them into sets and staples them and then deposits them in the delivery tray 151.

The digital image reproduction device may be a printer only, but preferably is a multi-functional device further including scanning, copying or faxing functions, e.g. a versatile copier. A document feeder 110 is provided with an input tray 111 for the introduction of a stack of documents, a transport mechanism (not shown) for transporting the documents one by one along a scanner unit 120, and a delivery tray 112, in which the documents are placed after scanning.

A further delivery unit, e.g. a finisher for collating and stapling documents, may be coupled to the device.

The scanner unit 120 includes a flat bed scanner provided with a glass platen on which an original document can be placed, a CCD array and an imaging unit having a movable mirror and lens system for imaging the document on the CCD array. In these conditions, the CCD array generates electrical signals, which are converted into digital image data in manner known per se.

Figure 2:
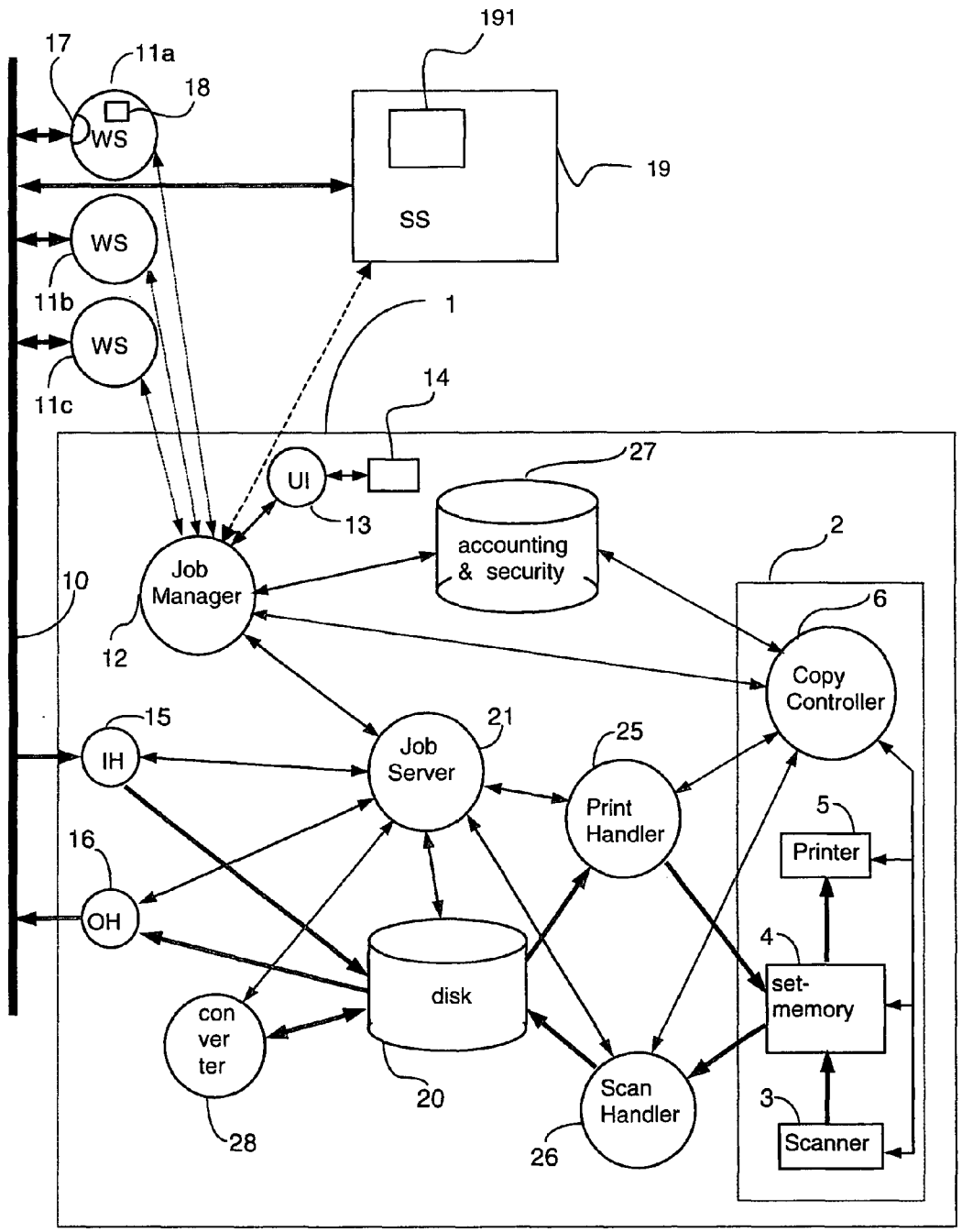
FIG. 2 is a diagram of the constituent parts of a digital image reproduction device in a networked system.

The control unit of the apparatus is shown diagrammatically by reference numeral 170, and explained in more detail in sub-units 12, 20, 21, 25, 26, 27, 28 with reference to FIG. 2. A cable 171 may connect the control unit 170 via a network unit 15, 16 to a local network 10 (shown in FIG. 2). The network may be wired, but may also be partly or completely wireless.

The apparatus has a user interface 160, for example including an operator control panel provided on the apparatus for operation thereof. The user interface may be provided with a display and keys. According to the present invention the user interface has at least one kickstart control element 161, which is sensitive to activation by a user, and provides an electronic signal to the control unit 170. A number of kickstart control elements may be provided as buttons with labels that show the kickstart processing job assigned to the button. Alternatively, the kickstart control elements may be provided on a touch screen display as soft buttons (see FIG. 4), or in any other way that allows adapting an indication of the function. The operation of the kickstart control element and examples are described below with reference to FIGS. 3 and 4.

FIG. 2 shows a diagram of the constituent parts of a document processing apparatus in a networked system. In FIG. 2, control connections are indicated by means of thin arrows and data transport connections by means of thick arrows. The apparatus 1, a multi-functional copier, comprises a basic unit 2 which contains a scanner unit 3, a printer unit 4, a set memory 5 and a control unit 6 for these units, hereinafter termed the CopyController. The basic unit 2 contains the units and functions required for making a simple copy. During the scanning of an original document, the scanner 3 generates digital image data and stores them in the set memory 4, whereafter the printer 5 reads out the image data from the set memory 4 and prints them on an image support, usually a sheet of paper. This process is controlled by the CopyController 6. The set memory 4 in this description may also include image processing functions, although this is not essential to the present invention and is therefore not explained further.

The apparatus 1 also includes a number of units required to print digital image data which are fed via a local network 10 from a network environment, and for exporting digital image data generated by the scanner 3 to the network environment via the same local network 10. The network system or environment as used here includes one or more user workstations (WS) 11a, 11b, 11c, on which a program is operative for communication with the apparatus according to the present invention, and which are also connected to the local network 10. In addition, one or more server stations may be coupled to the networked system, and provide central services, such as storing user data or access rights as explained below.

The apparatus 1 is provided with a management unit 12, hereinafter referred to as the: JobManager, which manages the document processing processes and also updates an administration system for all the copying, scanning and print jobs present. A UserInterface (UI) 13 is provided with an operator control panel on the apparatus housing, with a display and keys for operation of the apparatus 1. A kickstart control unit 14 is provided for entering kickstart commands, e.g. buttons or a touch screen. Furthermore, the apparatus has a network unit including an InputHandler (IH) 15 for receiving and transmitting digital data reaching the apparatus via the network 10 from the network environment and an OutputHandler (OH) 16 for sending digital data via the network 10 to the digital environment. The JobManager 12 is logically connected to the workstations I1 a-c indicated diagrammatically by direct broken-line arrows.

The apparatus 1 may have a storage unit 20 formed by a high-capacity hard disk, and a unit 21 hereinafter referred to as a JobServer, for managing the data files on the storage unit 20 and for controlling the processing processes. The electronic control of the apparatus may further include a control unit 25 hereinafter referred to as a PrintHandler, which is dedicated to controlling a printing process, and a control unit 26 hereinafter referred to as a ScanHandler, which is dedicated to controlling a scanning process, an accounting and security unit 27, which inter alia manages the authorization of users and access codes, a conversion unit 28 for converting digital data files to different formats. Note that these functions may also be centrally accommodated in a server station.

The networked system includes a memory system 191 that provides a dynamic set of logical storage spaces. The storage spaces are dynamically assigned to respective users for storing their document processing items, such as print jobs or scan jobs, that they have submitted to the apparatus from their workstation. A print job generally contains image data defining document and print process settings, such as, e.g., simplex/duplex and number of copies. A scan job generally contains a set of scan process settings, such as, e.g., resolution and file name and format. Upon execution of a scan job, the scan file generated in the process is stored in the user's storage space. The logical storage space for a user, also called a mailbox, provides a temporary storage for that user's jobs. Note that the jobs may be deleted after execution, or may be maintained for later use. The memory system may be accommodated in a server station (SS) 19, or in the apparatus 1, e.g. by the JobManager 12 and physically storing the jobs on the storage unit 20. The logical storage space is a data space that is temporarily assigned to a user as long as there are jobs to be stored for that user, e.g. print jobs sent to a specific printer. As soon as all jobs have been executed and/or removed, the mailbox may automatically be deleted.

The workstation 11*a* has a network unit 17 for communicating via the network 10 for connecting the workstation to the digital document processing apparatus 1 and/or the server station 19. Furthermore, the workstation has a control unit 18 for creating a print job related to a digital document at the workstation. Digital data files that are submitted to the apparatus 1 via the network for printing may be of a direct printing type, i.e. jobs to be printed automatically without further action on the part of an operator at the apparatus. Processing jobs of a so-called interactive type are entered via the networked system into the logical storage space of the user, and are not executed until an operator request at the digital image reproduction device. The type of job is determined at the workstation of the user, and is apparent from an attribute added to the data transferred. Handling of interactive processing jobs, and accommodating the logical storage spaces for users, is extensively described in the above-mentioned U.S. Pat. No. 6,545,769 or U.S. Pat. No. 5,825,988.

According to the present invention, the digital image reproduction device has a user interface unit 13 for controlling the processing jobs that are stored in the logical storage space and waiting to be executed; and a management unit 12 arranged for providing, at the user interface unit, control elements for a user to select a processing job from the processing jobs in the logical storage space and executing the selected processing job by processing documents in the digital image reproduction device. A processing job may for example be printing or scanning a document, and may include further functions such as copying, faxing or emailing. Thereto, the management unit 12 communicates with the memory system 191 which stores the processing jobs that have been submitted. The memory system 191 is arranged for managing the processing jobs in at least one logical storage space, usually called a mailbox or queues containing the processing jobs that are waiting to be executed.

In particular, the management unit is arranged for identifying at least one kickstart processing job from the processing jobs in the memory unit based on kickstart criteria. Basically, the management unit thereto applies the kickstart criteria to all processing jobs waiting in the different logical storage spaces. For example, the kickstart criteria may include the age of the jobs, i.e. the time period that has lapsed since the job has been submitted. The most recent jobs may be identified as kickstart processing jobs.

Subsequently, the management unit 12 provides, at the user interface unit, at least one kickstart control element, e.g. a soft button, and assigns a kickstart processing job to each kickstart control element. On the user interface unit, e.g. on a display screen, the management unit indicates, for each kickstart control element, a kickstart processing job coupled to the respective kickstart control element.

When the respective kickstart control element has been activated by a user, the management unit initiates the respective kickstart processing job in the digital image reproduction device. For executing a kickstart print job (e.g. called a "kickscan" job), the data for printing included in the job are retrieved from the logical storage space of the user. For executing a kickstart scan job, the scan process settings are retrieved from the logical storage space of the user, whereas the data obtained by scanning a document may be stored in the local memory, e.g. under a pre-selected filename, or in a user's mailbox. Other types of kickstart processing jobs, such as faxing, copying, emailing, device cleaning or maintenance, testing, etc, may require further document handling, data transfer and/or processing known as such. A kickstart processing job may be performed according to predefined settings, e.g. a general or personal profile, like a personal scan profile for a kickscan job. It is to be noted that any type of processing job may be prepared or selected at a user workstation and submitted or scheduled for kickstart execution to the digital image reproduction device.

The digital image reproduction device may physically be equipped to perform, at least partly, the functions of the memory system 191, e.g. having a hard disk unit and controller for physically storing print files associated to print jobs.

The digital image reproduction device usually has a delivery unit such as a tray or finisher for delivering processed documents on one side of the device. In an embodiment of the device, the at least one kickstart control element is located on the user interface unit remote from the delivery unit, i.e. at the other side with respect to the location of the delivery of documents. This allows easy access to the kickstart control element for a new user that walks up to the device while another user has already started a job and is waiting for the delivery of the processed documents, usually near the delivery unit.

Usually, the digital image reproduction device has a printer unit 4. It is noted that the kickstart processing job may be defined as a workflow or set of sub-jobs. For example, the kickstart processing job may include the most recent print job of the user as its first sub-job, and the earlier submitted jobs as further sub-jobs. Then the management unit 12 may first detect a print job in the kickstart processing job that has been started by the user activating the kickstart control element, and subsequently first execute the print job via the printer unit 4. Furthermore, processing sub-jobs may consecutively be started, or may be presented for confirmation by the user.

In addition, the digital image reproduction device may include a scanner unit 3. The management unit 12 may be arranged for detecting a scan job in the initiated kickstart processing job and executing the scan job by scanning a physical document entered in the scanner unit 3, and for storing the image file generated in the scanning in the logical storage space of the user who activated the kickstart processing job. It is noted that the management unit may detect the presence of documents to be scanned and subsequently automatically start the scan job. A print job included in the kickstart processing job assigned to the kickstart control element may be started immediately, and may be executed in parallel with a scan job.

Figure 3:
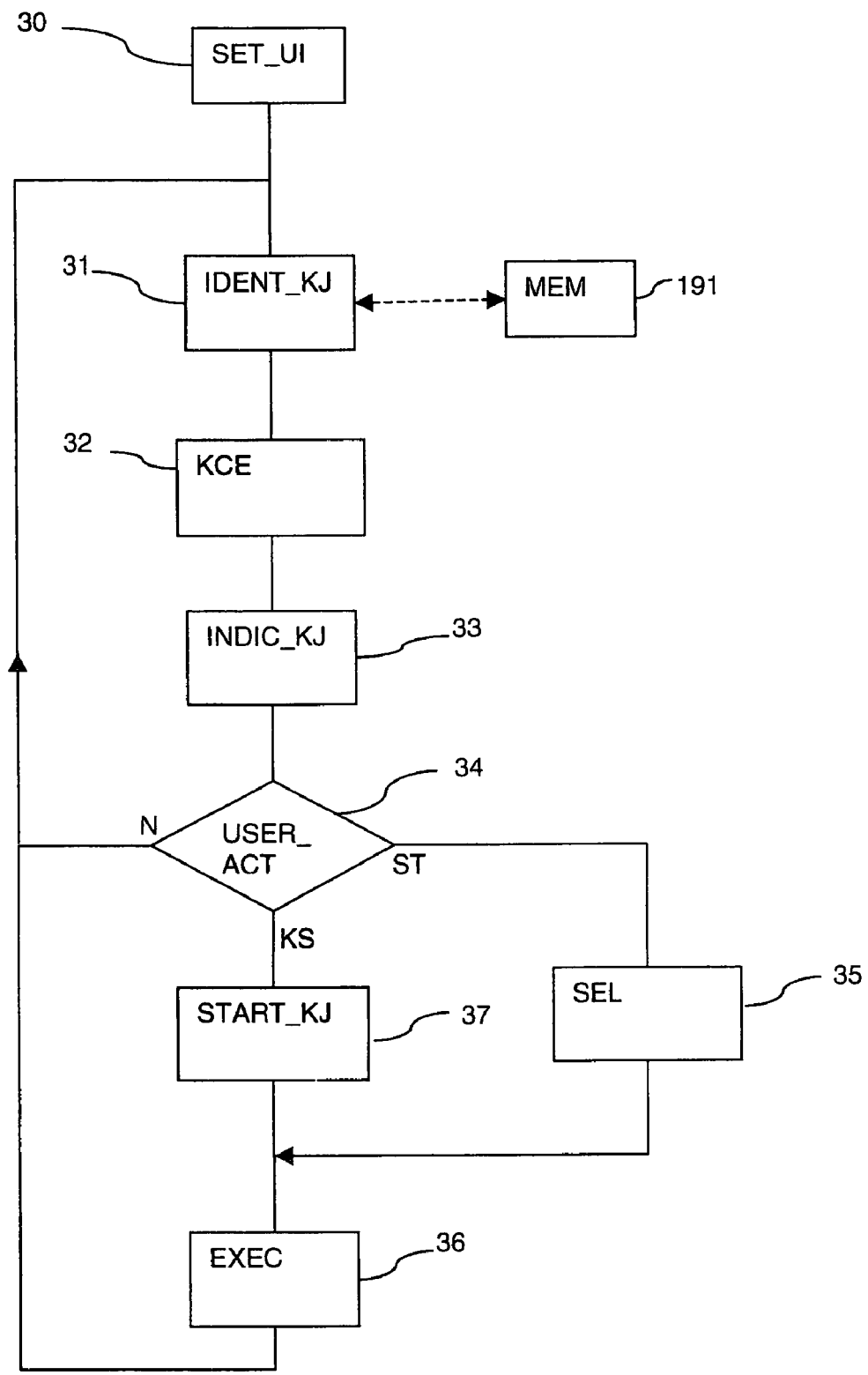
FIG. 3 illustrates a method of controlling document processing in a networked system via kickstart control elements.

FIG. 3 shows a method of controlling document processing in a networked system via kickstart control elements in accordance with the present invention. The networked system has been described above with reference to FIG. 2. The method has the following steps. A first step SET_UI 30 provides, at the user interface unit 13, control elements for a user to select a processing job from the processing jobs in the logical storage space. The control elements may include standard buttons to start print or copy jobs, or to access a user's mailbox. When a user manipulates the standard control elements as indicated in step USER_ACT 34, the method branches via ST to step SEL 35. The standard user interface allows the user to further select a processing job as indicated in step SEL. In step EXEC 36 the selected processing job is executed by processing documents in the digital image reproduction device.

According to the present invention, the method proceeds after the initial setting of the user interface at step SET_UI, to a step IDENT_KJ 31, which accesses the memory system (MEM) 191 and identifies at least one kickstart processing job among the processing jobs waiting for execution in the memory unit. The identifying is based on kickstart criteria for selecting a limited number of kickstart processing jobs, the number corresponding to a pre-programmed number of available kickstart control elements. If there are no jobs matching the kickstart criteria, the list of kickstart control elements is empty. If not empty, the next step KCE 32 provides, at the user interface unit 13, at least one kickstart control element. For example, kickstart control elements are colored areas on a touch screen, or labels on a display for buttons near the display. Next, in step INDIC_KJ 33, a display indication like a user name and/or job name is coupled to the respective kickstart control element at the user interface unit for each kickstart control element. When, at USER_ACT 34, the respective kickstart control element has been activated by a user, the method branches via KS to step START_KJ 37, which initiates the selected kickstart processing job in the digital image reproduction device.

The step START_KJ 37 may include one or more of the following detailed actions, depending on a chosen implementation. The initiated kickstart processing job may be executed unconditionally, or depending on further conditions, e.g. user rights or settings. For retrieving or storing details, files or settings of the initiated processing job, the logical storage space containing the initiated kickstart processing job may be accessed. When the initiated kickstart processing job is a print job, the corresponding digital document is retrieved from a respective one of the logical storage spaces, rasterized and printed. When the initiated kickstart processing job includes a scan job, the scanner is set according to the settings specified in the job as stored in the respective one of the logical storage spaces, the scan process is started and the digital document created by scanning is stored, e.g. in the relevant logical storage space. The initiated kickstart processing job may be deleted from the respective logical storage space. Furthermore, a window or pop-up menu may be opened when a kickstart control element is activated, e.g. on top of other elements of the GUI, for providing further control elements for the respective user. The window may be manipulated (e.g. minimized) by the user.

The user associated to the initiated kickstart processing job may be further identified, and optionally authenticated, based on a detection of a dedicated user feature, like fingerprint recognition, voice recognition, processing of an image provided by a camera, or detecting a user tag, e.g. a radio frequency identification unit (RFID tagged badge, or an RFID device worn externally or inside a person, e.g. injected in ones arm). The digital image reproduction device may automatically show kickstart control elements for the user as identified. In a particular case, the user authentication is based on requesting an authentication code (like a PIN or job number). The accessing of the logical storage space and/or executing the initiated kickstart processing job may be performed in accordance with rights of the user as identified.

As described above, the memory system 191 may be arranged for managing a dynamic set of logical storage spaces for the processing jobs, each storage space dedicated to a respective user of the system, usually called mailbox. The step START_KJ 37 may further include mailbox operations, in addition to executing the initiated kickstart processing job. At the user interface, a mailbox interface of the user may be opened for manipulating the respective logical storage space containing the initiated kickstart processing job, i.e. the user who submitted the selected kickstart processing job is identified and the corresponding mailbox is opened automatically.

In an embodiment of the method of the present invention, the step START_KJ 37 is performed in dependence of interrupt criteria. A further processing job that is being executed may be interrupted and temporarily halted in one of the following ways. Interrupt may be made dependent on interrupt criteria like the remaining length of the currently running job, and/or the expected time required for the new job. When only a small part of a running job remains, no interrupt is allowed. An interrupt algorithm may decide which jobs may interrupt the running job. In this algorithm, there is a notion of "fair." An example of an unfair interrupt job is a 100-page job that interrupts a running job that has only 5 pages to go. For example fair may be defined as:

$$\#pages\ interrupting\ job < \#pages\ to\ go\ running\ job/2$$

Instead of the number of pages, the processing time may be used as a criterion for allowing or disallowing interrupt. The processing time may be calculated according to well-known methods, that do not per se form part of the present invention, based on the engine speed (pages per minute), rasterizing time (very complex pages may take longer to rasterize than the engine speed allows and result in page delays) and possible other engine-related time constraints. Furthermore, a fixed non-interruptable portion at the end of a job, or a maximum processing delay time, either defined as a fixed value or as a percentage of the total processing time of the job to be interrupted, may be pre-defined or pre-set by an operator in the user interface.

In a further embodiment, interrupt between the two images of duplex pages is prevented, for obvious reasons.

Normally the kickstart buttons refer to the last submitted jobs of five distinct users. However, when the engine is printing, the kickstart buttons may refer only to submitted jobs that are allowed to interrupt the running job. The restriction has the effect that while the running job reaches completion the number of allowed kickstart jobs decreases and in the end there are no kickstart buttons left (there are no fair interrupt jobs left). It is noted that, to indicate that a kickstart control element is currently not functional, it may be minimized, shaded or have a different color. Besides adapting the kickstart buttons, the jobs in the mailbox allowed to interrupt the running job, may have a different (background) color. Also, a separate interrupt indicator may be provided, e.g. a simple LED, for indicating that the running job may be interrupted, i.e. that it may be fair to interrupt the running job via the kickstart control. Users waiting at some distance from the UI can see that the running job can be interrupted.

The initiated kickstart processing job may be executed, and subsequently the further processing job is to be resumed. The initiated kickstart processing job may be performed in an interleaved mode with the further processing job, e.g. alternatingly printing pages (or small groups of pages) and guiding the pages to respective delivery units. Preferably, a status is displayed indicating which job and/or delivery unit is active, e.g. via the status indicator 43, that will be described below with reference to FIG. 4.

Furthermore, the initiated kickstart processing job may be inserted in a queue of processing jobs prior to at least one further processing job waiting to be executed, i.e. getting a higher priority due to activating the kickstart control element. The GUI may show the queue of jobs scheduled for execution, e.g. a list or collapsed to a number of jobs and waiting time indication. Moreover, the step of initiating the kickstart processing job may include detecting a specific activation of the kickstart control element by the user, like double activation or continuous activation in a predefined time period. For example, by a single activation, the kickstart processing job may be planned after the current running job, or at the end of the queue, while the double activation or continuous activation immediately starts the kickstart processing job by (temporarily) halting the running job, or inserts the job in the queue at high priority.

The step IDENT_KJ 31 of identifying at least one kickstart processing job may comprise the following. The age of the processing jobs in the memory unit is detected and applied as kickstart criteria. For example, the kickstart processing jobs that are assigned to the available kickstart control element includes the processing job having the lowest age. Furthermore a time interval after the processing job has been submitted may be detected as kickstart criteria. There is always a time interval before the user may arrive, even if he immediately walks to the digital image reproduction device after submitting the job. The time interval may be set, in general or for each user individually, to the minimum time the respective user needs to move from the workstation to the digital image reproduction device.

The step KCE 32 of providing at least one kickstart control element may include providing a plurality of kickstart control elements arranged in dependence of said detected age of the kickstart processing jobs coupled to the respective kickstart control elements. For example, the most recent job may always have a predefined position, e.g. the top position of a row of kickstart control elements. However, if a same user submits a second job, both jobs may be assigned to the same kickstart control element, while the kickstart control element may have the ranking according to the most recently submitted job.

The step KCE 32 of providing at least one kickstart control element may further include the removal of a kickstart control element coupled to a kickstart processing job that is to be replaced by a different kickstart processing job according to the kickstart criteria. It may further indicate that replacement of the kickstart processing job is imminent. For example the removal may be made visible by gradually fading away the kickstart control element, gradually moving the kickstart control element across a border of a display, and/or gradually changing a color of the kickstart control element. Also an audible warning may be produced, in particular if the kickstart control element is activated shortly after a change, and a confirmation may be asked.

In a further embodiment, the method according to the present invention may include providing at least one kickstart user profile, and arranging one or more of the steps described above in dependence of profile criteria defined in the kickstart user profile. For example, a user may set in his profile that all pending jobs must be processed, or that only the most recent job must be processed.

In general, the operation of the digital image reproduction device may further be affected by functions implemented at the user workstation. For example, a user kickstart profile may be set at the workstation. The user may open a mailbox on the workstation and review any pending processing jobs. On a display of the workstation it may be indicated that a kickstart control element is currently assigned to a processing job submitted by a user, e.g. as a dedicated icon on a desktop or taskbar, or as an indicator or color in a list of submitted, pending processing jobs in a user's mailbox. User commands, or a user behavior pattern indicative of the user intending to initiate a processing job, may be detected, and said detection may subsequently be included in the kickstart criteria. For example, the software may generate a button on the user's workstation display, which on activation signifies to the server system that the user intends to walk to the digital image reproduction device. When the user indicates he wants to print from the desktop, this could place him for a certain time, e.g. 5 minutes, in the kickstart list. Such an action may also imply a digital image reproduction device wake-up from sleep mode.

A user behavior pattern may be detected as follows. The device recognizes patterns in the print behavior of the users and will put users in the kickstart list according to the chance that they will start printing soon. Some people walk to the printer for every single job, while others collect after a number of jobs. Thereto a (background) software function may detect the submitting of a processing job by a user and, in a subsequent period of a predetermined length, detect the absence of the user, and subsequently include the absence in the kickstart criteria. Furthermore, the submitting of a processing job by a user may be delayed to affect the kickstart criteria until, in a subsequent period of at least a predetermined length, the absence of the user has been detected. The absence may for example be detected by a lack of user interaction with the workstation like keyboard or mouse activity, signals from a sensor coupled to the workstation such as a camera or microphone, or a change of operational mode of the workstation such as activation of a screen saver, keyboard or device lock, or a different power mode. For example, the user may lock his keyboard when leaving the room, or switch his computer to a standby mode.

Figure 4:
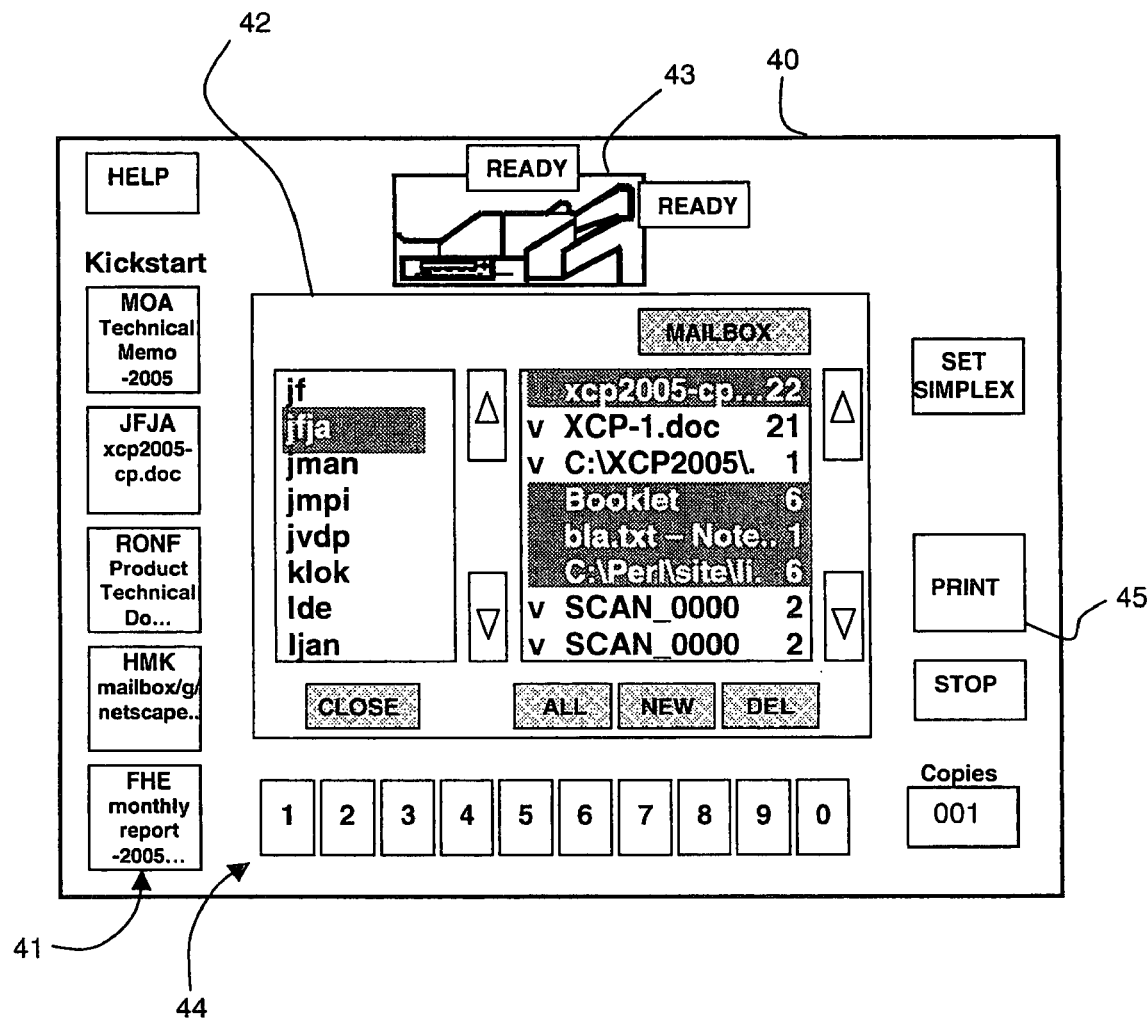
FIG. 4 illustrates a user interface having kickstart control elements.

FIG. 4 shows a user interface having kickstart control elements. The Figure shows a display 40 as part of a graphical user interface (GUI) of a digital image reproduction device, for example a touch screen. A number of control elements are provided on the display, for example numerical buttons 44 and a start button 45. A central area 42 provides a variable display area for information to the operators of the device. In the Figure the area 42 shows on the left a list of users that are sharing the device, while highlighting one user (identified by the code "jfja"). The area 42 shows on the right the mailbox of the highlighted user. In the upper part of the display 40 a status indicator 43 is provided, which schematically shows the apparatus and the status of two available document processing units, e.g. delivery units both currently showing the status "ready". The status may for example change to "printing" when in operation, "paused" when interrupted, or "error" when a fault condition occurs. On the left side of the display 40 a number of kickstart control elements 41 is shown. Each element indicates the kickstart processing job coupled thereto by showing the user code (for example MOA) and the job name (for example Technical Memo_2005 . . . ). In addition, or alternatively, the kickstart control elements 41 may show a personal image (e.g. a photograph) of the user who submitted the job, for easy recognition.

The kickstart button 41 is an extreme speed up to print the last submitted job for a user. In the Figure, a list of five kickstart buttons is displayed on the left of the GUI display. The top five distinct users who have recently submitted a job (not printed yet) are in this kickstart list. The text in the kickstart button contains the name of the user and the name of the last submitted job. The user can start the job with one push on the kickstart.

The default behavior of a kickstart button may be as follows: It prints the last submitted job and it opens the mailbox of the user. When the job is printing it will disappear from the kickstart button list. If the user has a pincode on the mailbox or on the job these will be asked for. To keep the level of security high there will be no job name in the kickstart button if either a mailbox or job pin exists.

The kickstart buttons are positioned on the left side for two reasons. First, the western society thinks from left to right so a user will find it fast. Second, by placing them on a position remote from the output units, they are more suitable for activating jobs in interrupt or interleave mode by a second person at the device. The first user, waiting for his prints to appear, will usually take in a position near the finisher at the right side of the apparatus.

In an embodiment, on the GUI, the user who's mailbox is open will not appear in the kickstart control elements to maximize the number of different users with direct access to their jobs.

In a further embodiment, called frozen kickstart, e.g. for supporting a meeting, a user or administrator of the device can assign one or more kickstart control elements to a certain mailbox, or one or more selected processing jobs, for a certain time. The frozen kickstart control element for example allows access to a shared mailbox from which one or more documents may be printed multiple times by different users. The feature of a shared mailbox is in itself very handy for support of meetings by assuring that all members have the same set of meeting documents, arranged in the same order. Connecting that shared mailbox to a frozen kickstart control element further improves user convenience.

In a further embodiment, a list of users who have jobs in their mailbox is displayed at the GUI, and has a default focus on the middle of the list. By focusing on the middle of the list, the number of steps for users who are not displayed in the visible part of the list is minimized. Furthermore, users having a kickstart control element assigned (which also opens the mailbox) may temporarily be excluded from the list.

Figure 5:
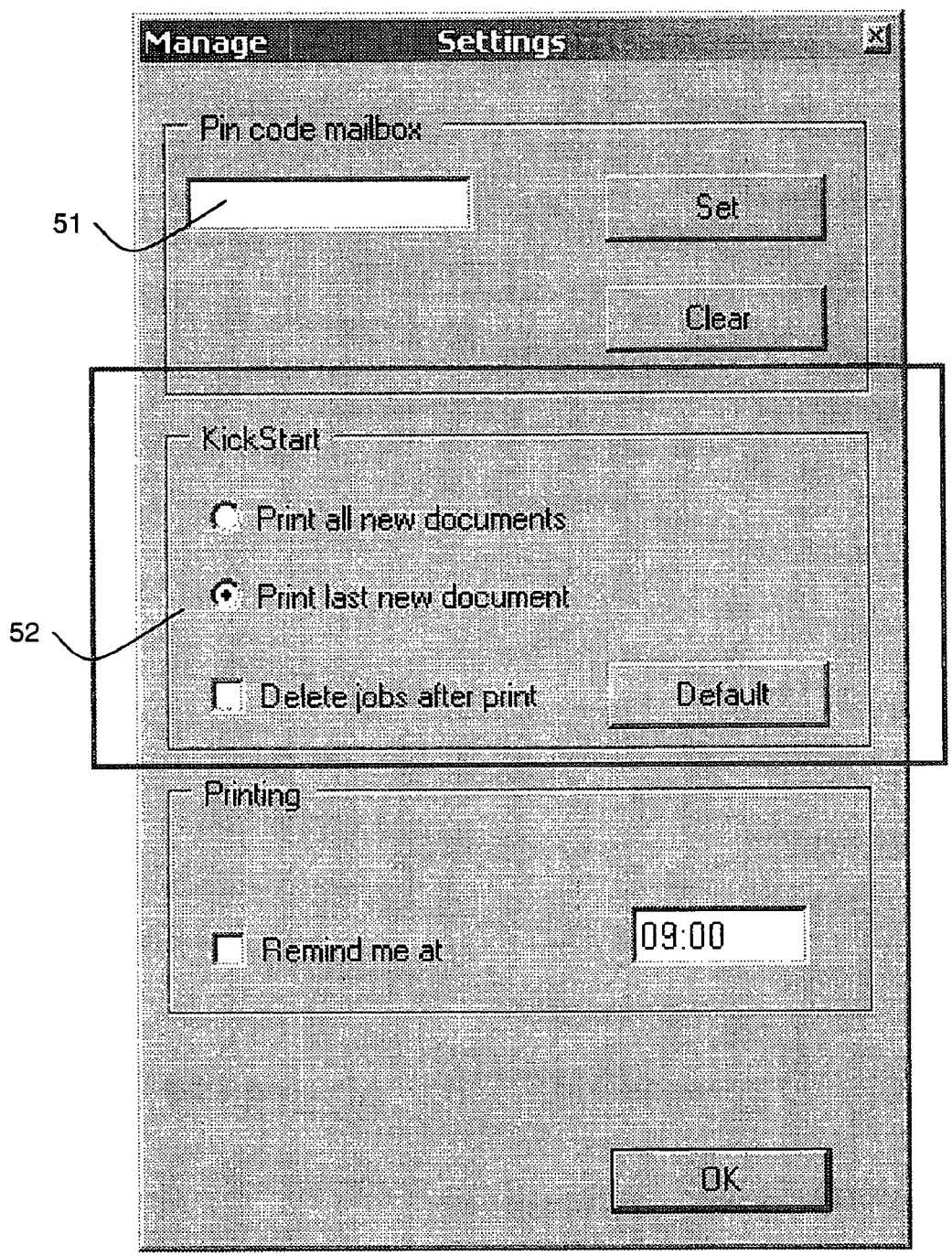
FIG. 5 illustrates setting of a kickstart user profile.

FIG. 5 shows setting a kickstart user profile. The Figure shows a window 51 to be displayed either on a display of a workstation, or on the GUI of the digital image reproduction device. In the area 52 a number of settings are shown for adjusting the operation of the kickstart control element to the user's personal preferences, or as a general setting for a company or department. The kickstart function may be set to print all new documents, or to print only the last new document, and, after printing, to delete the documents. Furthermore, a PIN code may be set. If a user has a pin code on his mailbox the name of the job will not be visible in the kickstart button. If the user presses the kickstart button, the system asks for the mailbox pin code in a dialog.

The user may further set a job level pin code (not shown). If a job is printed with a pin code the name of the job will not be visible in the kickstart button. If the user presses the kickstart button, the job pin code will be asked for. If a kickstart is pressed and there exist both a job pin and a mailbox pin, the job pin will be asked first, so the engine can start printing and then the mailbox pin is asked to open the mailbox.

Using a desktop application and the window, users can configure the personal behavior of their kickstart button. Options may include:

Print without opening mailbox. This is attractive in combination with delete after print;

Do not show jobs as kickstart (enable/disable), e.g. for confidential jobs;

The ability to upload a personal image which will be displayed on the kickstart button. This might make it easier to find the button;

Don't print the job, just open mailbox (and focus on most recent job); and

Show only username in Kickstart Oob name always hidden).

Some issues have been noted regarding the dynamic behavior of the kickstart buttons. Suppose a new job is submitted by a new user X that is not in the kickstart button list yet. He is added automatically to the top of the kickstart list. At the same time, another user Y will drop from the bottom of the list. When a user Z prints a job from the kickstart list, the kickstart control element Z will be removed from the list. As the kickstart list will display the top five kickstart processing jobs, Y will be back at the bottom of the list. User Y can even proceed to the topmost position in the list. Due to this property of the kickstart button list users can kickstart much older jobs than might have been expected.

Also, in interrupt printing, kickstart control elements operate well. Interrupting, i.e. pausing a current (long) job to quickly print a smaller job for a second user, is a function that is sensitive to social relations, because the device is being shared. Kickstart makes the user interface barrier as small as possible. With one click the current job is paused, the interleave job is printed and the original job is resumed.

Although the invention has been mainly explained by embodiments in a company environment, e.g. for printing in a department, it is to be noted that the invention is also suitable for document processing on a different scale, such as the public commercial service, or a family printer shared by members of one household. Furthermore, the kickstart function may be used in multifunction devices or special printing devices like industrial wide format printers. It is noted, that in this document the use of the verb 'comprise' and its conjugations does not exclude the presence of other elements or steps than those listed and the word 'a' or 'an' preceding an element does not exclude the presence of a plurality of such elements, that any reference signs do not limit the scope of the claims, that the invention and every unit or means mentioned may be implemented by suitable hardware and/or software and that several 'means' or 'units' may be represented by the same item. Further, the scope of the invention is not limited to the embodiments, and the invention lies in each and every novel feature or combination of features described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of expediting document processing in a networked system, the system comprising at least one user workstation for submitting processing jobs of a user; a management unit; a memory unit that stores the processing jobs, the memory unit being arranged to manage the processing jobs in at least one logical storage space; and a digital image reproduction device for document processing, the digital image reproduction device being arranged so as not to execute processing jobs of its own motion, and having a local user interface unit for controlling the processing of jobs that are stored in the logical storage space and waiting to be executed, wherein initiating processing of jobs is normally accomplished at the local user interface by user performance of a plurality of steps, at least including selection of a particular processing job and executing a start command, said method of expediting comprising, in addition to the said normal initiating of jobs, the steps automatically performed by the management unit, of:

selecting, based on pre-defined kickstart criteria, a plurality of processing jobs from the processing jobs in the memory unit, as kickstart processing jobs and providing, at the local user interface unit, a kickstart control element associated with each one of the selected plurality of processing jobs to immediately activate a job by user activation of the associated kickstart control element;

indicating, at the user interface unit, for each kickstart control element, an identification of the kickstart processing job coupled to the respective kickstart control element; and wherein a kickstart processing job is activated in the digital image reproduction device in response to user activation of the respective kickstart control element by a single direct action of a user.

2. The method as claimed in claim 1, wherein the step of initiating the kickstart processing job further comprises at least one of the following steps:

accessing the logical storage space containing the initiated kickstart processing job;

executing the initiated kickstart processing job; and deleting the initiated kickstart processing job from the respective logical storage space.

3. The method as claimed in claim 1, wherein the kickstart job is a scan job and wherein the step of initiating the kickstart processing job further comprises the steps of:

executing the initiated kickstart processing job; and storing a digital document in a respective one of the logical storage spaces according to the initiated kickstart processing job.

4. The method as claimed in claim 1, wherein the step of initiating the kickstart processing job further comprises the step of identifying the user associated to the initiated kickstart processing job based on a detection of a dedicated user feature, and accessing the logical storage space or executing the initiated kickstart processing job in accordance with rights of the user as identified or performing both said accessing step and said executing step.

5. The method as claimed in claim 4, wherein the step of identifying the user associated to the initiated kickstart processing job is based on requesting an identification code or detecting a user tag.

6. The method as claimed in claim 1, wherein the memory unit is arranged for managing a dynamic set of logical storage spaces for the processing jobs, each storage space dedicated to a respective user of the system, and wherein the user interface unit of each image reproduction device includes control elements for a user to open a logical storage space, select a processing job from the processing jobs therein and for commanding execution of the selected processing job, and the step of initiating the kickstart processing job further comprises an automatic step of providing, at the user interface, a mailbox interface for manipulating the respective logical storage space containing the initiated kickstart processing job.

7. The method as claimed in claim 1, wherein the step of providing a kickstart control element further comprises the step of configuring said element to display a personal image of the user who submitted the associated kickstart processing job.

8. The method as claimed in claim 1, wherein the step of initiating the kickstart processing job further comprises, when a further processing job is being executed and in dependence of interrupt criteria, any one of the steps of:

interrupting the further processing job that is being executed, executing the initiated kickstart processing job, and continuing the further processing job;

executing the initiated kickstart processing job in an interleaved mode with the further processing job that is being executed; and inserting the initiated kickstart processing job in a queue of processing jobs waiting for execution, in a particular case immediately after the further processing job that is being executed.

9. The method as claimed in claim 1, wherein the step of selecting a kickstart processing job is based on age of the processing jobs in the memory unit as kickstart criterion.

10. The method as claimed in claim 9, wherein the step of providing at least one kickstart control element further comprises a step of providing a plurality of kickstart control elements arranged in dependence of the age of the kickstart processing jobs coupled to the respective kickstart control elements.

11. The method as claimed in claim 10, wherein the step of providing at least one kickstart control element further comprises a step of removing a kickstart control element coupled to a kickstart processing job when that job is to be replaced by a different one according to the kickstart criteria by indicating that replacement of the kickstart processing job is imminent.

12. The method as claimed in claim 11, further comprising visually indicating that replacement of the kickstart job is imminent by at least one of gradually fading away of the kickstart control element; gradually moving the kickstart control element across a border of a display area; and gradually changing a color of the kickstart control element.

13. The method as claimed in claim 2, wherein said steps of the kickstart processing job initiation are user-configurable.

14. A digital image reproduction device for document processing for use in a networked system, the system comprising at least one user workstation for submitting processing jobs of a user; a management unit; and a memory unit that stores the processing jobs, the memory unit being arranged to manage the processing jobs in at least one logical storage space, the digital image reproduction device being arranged so as not to execute processing jobs of its own motion and comprising:

a local user interface unit for controlling the processing jobs that are stored in the logical storage space and waiting to be executed, wherein initiating processing of jobs is normally accomplished at the local user interface by user performance of a plurality of steps, at least including a selection of a particular processing job and executing a start command; and a management unit arranged for:

automatically selecting, based on pre-defined kickstart criteria, at least one processing job from the processing jobs in the memory unit, as kickstart processing jobs and providing, at the local user interface unit, a kickstart control element for each one of the selected plurality of processing jobs to immediately activate a selected processing job by user activation of the associated kickstart control element;

indicating, at the user interface unit, for each kickstart control element, an identification of a kickstart processing job coupled to the respective kickstart control element; and wherein a kickstart processing job is activated in the digital image reproduction device in response to activation of the respective kickstart control element by a single direct action of a user.

15. The digital image reproduction device as claimed in claim 14, wherein the device comprises at least part of the memory unit.

16. The digital image reproduction device as claimed in claim 14, wherein the management unit is arranged for using age of processing jobs in the memory unit as a kickstart criterion.

17. The digital image reproduction device as claimed in claim 14, wherein the management unit is arranged for including a personal image of a user who submitted a processing job, in a kickstart control element coupled to that processing job.

18. The digital image reproduction device as claimed in claim 14, further comprising a printer unit, and the management unit is arranged for detecting a print job in the initiated kickstart processing job and executing the print job via the printer unit.

19. The digital image reproduction device as claimed in claim 14, further comprising a scanner unit, and the management unit is arranged for detecting a scan job in the initiated kickstart processing job and executing the scan job by scanning a physical document entered in the scanner unit and storing the image file generated in the scanning in the logical storage space according to the initiated kickstart processing job.

20. A computer program product embodied on a non-transitory computer readable medium for performing a method of expediting document processing control in a networked system, the system comprising at least one user workstation for submitting processing jobs of a user; a management unit; a memory unit for storing the processing jobs, the memory unit being arranged for managing the processing jobs in at least one logical storage space; and a digital image reproduction device for document processing, the digital image reproduction device being arranged so as not to execute processing jobs of its own motion, and having a user interface unit at the at least one user workstation for controlling the processing jobs that are stored in the logical storage space and waiting to be executed, wherein initiating processing of jobs is normally accomplished at the user workstation by user performance of a plurality of steps, said computer program product being operative to cause a processor to perform the steps of:

initiating a normal job and automatically selecting, based on pre-defined kickstart criteria, a plurality of processing jobs from the processing jobs in the memory unit, as a kickstart processing jobs;

providing, at the user interface unit, a plurality of kickstart control elements for initiating processing of a kickstart processing job for each one of the selected plurality of processing jobs by a step of user activation of the associated kickstart control element;

indicating, at the user interface unit, for each kickstart control element, a kickstart processing job coupled to the respective kickstart control element; and wherein a kickstart processing job is initiated in the digital image reproduction device in response to activation of the respective kickstart control element by a single direct action of a user.

21. The method of claim 1, wherein the plurality of steps for normally initiating execution of processing jobs comprises a user performing a plurality of steps including identifying a relevant printing or scanning job by selecting a respective logical storage space and accessing it, selecting the relevant job, and operating a print or scan key.

* * * * *